United States Patent [19]

Amstutz

[11] 4,185,379
[45] Jan. 29, 1980

[54] ROSE AND SHRUBBERY TRIMMER

[76] Inventor: Willis J. Amstutz, 307 E. Monroe St., Pandora, Ohio 45877

[21] Appl. No.: 924,735

[22] Filed: Jul. 14, 1978

[51] Int. Cl.² .............................................. B26B 13/00
[52] U.S. Cl. ...................................................... 30/134
[58] Field of Search .......................... 30/134, 135, 124

[56] References Cited

U.S. PATENT DOCUMENTS

| 1,458,878 | 6/1923 | Dexter | 30/134 |
| 3,520,058 | 7/1970 | Pfaffenbach | 30/134 |

FOREIGN PATENT DOCUMENTS 602098  12/1925  France ........................................ 30/135

*Primary Examiner*—Jimmy C. Peters
*Attorney, Agent, or Firm*—Daniel Jay Tick

[57] ABSTRACT

A holding part is affixed to the holding member of pruning shears and extends perpendicularly from the backing surface of said holding member along a blunt corner edge thereof. A clamping part is slidably mounted on the facing surface of a blade of the pruning shears for movement in directions toward and away from the cutting edge of the blade. The clamping part extends perpendicularly from the facing surface of the blade and has the same configuration as the holding part. The clamping part is spring-biased in position spaced from the cutting edge of the blade in a manner whereby when the shears are fully closed after severing a stem, the clamping part and the holding part securely clamp the severed stem between them.

1 Claim, 3 Drawing Figures

ROSE AND SHRUBBERY TRIMMER

BACKGROUND OF THE INVENTION

The present invention relates to a rose and shrubbery trimmer.

Trimmers of the type described herein are disclosed in the following United States patents. U.S. Pat. No. 633,736 issued Sept. 26, 1899 to Schoonover, U.S. Pat. No. 726,384, issued Apr. 28, 1903 to Welch, U.S. Pat. No. 778,140, issued Dec. 20, 1904 to Paff, U.S. Pat. No. 875,717, issued Jan. 7, 1908 to Low, U.S. Pat. No. 2,459,232, issued Jan. 18, 1949 to Mabrey and U.S. Pat. No. 2,715,269, issued Apr. 16, 1955 to Kaltenbach.

Objects of the invention are to provide a rose and shrubbery trimmer of simple structure, which is inexpensive in manufacture, utilized with facility, convenience and rapidity, and functions efficiently, effectively and reliably to permit the trimming of a rose or any type of shrubbery having sharp thorns or other impediments to the holding of a stem by hand after it has been severed from the bush or shrub. The rose and shrubbery trimmer of the invention avoids the need for the user to wear gloves, since the trimmer itself is utilized to carry the severed stem to a place of deposit without the need for the user to touch it, thereby saving him from cuts, stings, and the like.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
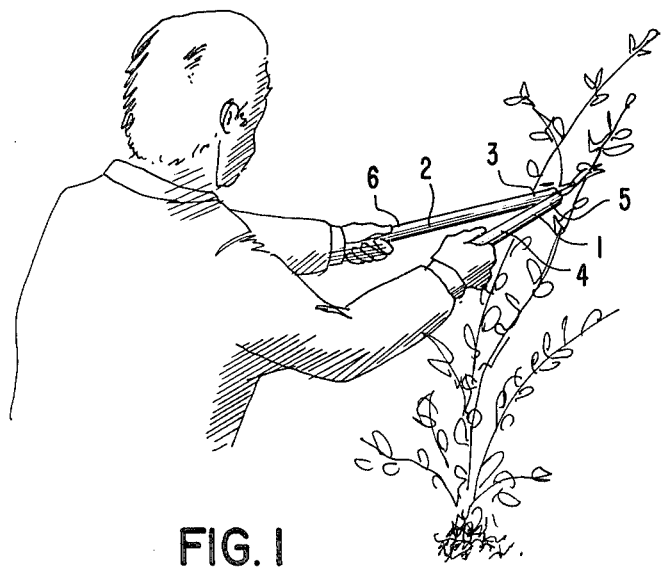
FIG. 1 is a perspective view of an embodiment of the rose and shrubbery trimmer of the invention in use.

The rose and shrubbery trimmer of the invention comprises pruning shears having first and second handle members 1 and 2 having spaced opposite first and second ends 3 and 4, and 5 and 6, respectively, as shown in FIG. 1. The handle members 1 and 2 are pivotally affixed to each other in the area of the first ends 3 and 5, respectively, thereof.

Figure 2:
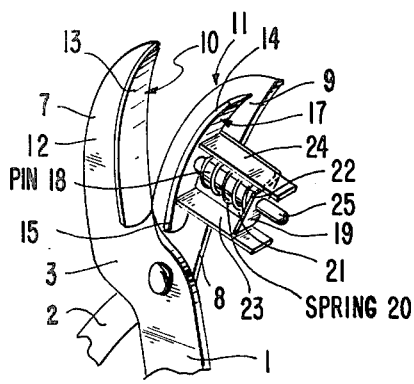
FIG. 2 is a perspective view, on an enlarged scale, of the holding and clamping parts of the rose and shrubbery trimmer of the invention when the pruning shears on which they are mounted are open.
Figure 3:
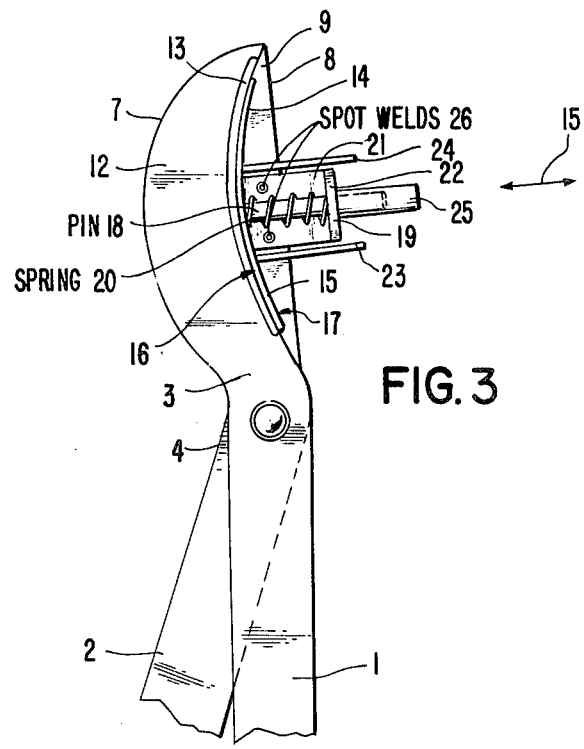
FIG. 3 is a side view, on an enlarged scale, of the holding and clamping parts of the trimmer of the invention when the pruning shears on which they are mounted are fully closed.

As shown in FIGS. 2 and 3, a holding member 7 extends from the first end 3 of the first handle member 1 and a blade 8 extends from the first end 4 of the second handle member 2. The holding member 7 and blade 8 have substantially planar facing surfaces facing each other. In the views of FIGS. 2 and 3, the facing surface of the holding member 7 is not seen. The blade 8 has a facing surface 9, shown in FIGS. 2 and 3. A blunt corner edge 10 (FIG. 2) is provided on the facing surface of the holding member 7. A cutting edge 11 (FIG. 2) is provided on the facing surface 9 of the blade 8. The holding member 7 has a spaced opposite backing surface 12 on the side opposite its facing surface, as shown in FIGS. 2 and 3. The blade 8 has a spaced opposite backing surface, not shown in the views of FIGS. 2 and 3, on the side opposite its facing surface 9.

In accordance with the invention, a holding part 13 is affixed to the holding member 7, preferably by welding, and extends substantially perpendicularly from the backing surface 12 of said holding member along the blunt corner edge 10 thereof, as shown in FIGS. 2 and 3.

A clamping part 14 is slidably mounted on the facing surface 9 of the blade 8 for movement in directions, indicated by arrows 15 in FIG. 3, toward and away from the cutting edge 11 of said blade, as shown in FIGS. 2 and 3. The clamping part 14 extends substantially perpendicularly from the facing surface 9 of the blade 8 and has substantially the same configuration as the holding part 13. The clamping part 14 is spring-biased in position spaced from the cutting edge 11 of the blade 8 in a manner whereby when the shears are fully closed, as shown in FIG. 3, after severing a stem, the clamping part 14 and the holding part 13 securely clamp the severed stem between them.

The clamping part 14 comprises a clamping part member 15 having substantially the same configuration as the holding part 13. The clamping part member 15 has a front surface 16 facing the holding part 13 and an opposite rear surface 17, as shown in FIG. 3. A pin 18 is welded to, and extends substantially perpendicularly from, the rear surface 17 of the clamping part member 15, as shown in FIGS. 2 and 3. A guide member 19 is affixed to the facing surface 9 of the blade 8 and slidably accommodates the pin 18. A spring 20 is mounted on the pin 18 in the guide member and abuts the clamping part member 15 and said guide member (FIGS. 2 and 3).

The guide member 19 comprises a plate member 21 affixed to the facing surface 9 of the blade 8 and bent at right angles to itself to form a lip 22 extending perpendicularly to said facing surface. The lip 22 has a bore formed therethrough which accommodates the pin 18. The guide member 19 is protected by a pair of side plates 23 and 24 extending from the rear surface 17 of the clamping part member 15 in spaced parallel relation perpendicular to the facing surface 9 of the blade 8 and straddling the guide member 19. The pin 18 is protected by a sleeve 25 which covers said pin. The plate 21 is preferably spot welded to the facing surface 9 of the blade 8 via a pair of spot welds 26 and the side plates 23 and 24 are welded to the rear surface 17 of the clamping part member 15.

While the invention has been described by means of a specific example and in a specific embodiment, I do not wish to be limited thereto, for obvious modifications will occur to those skilled in the art without departing from the spirit and scope of the invention.

I claim:

1. A rose and shrubbery trimmer, comprising pruning shears having first and second handle members each having spaced opposite first and second ends, said handle members being pivotally affixed to each other in the area of the first ends thereof, a holding member extending from the first end of the first handle member, and a blade extending from the first end of the second handle member, said holding member and said blade having substantially planar facing surfaces facing each other, a cutting edge on the facing surface of said blade and spaced opposite backing surfaces on the sides opposite said facing surfaces, said holding member having a blunt corner;

a holding part affixed to the holding member and extending substantially perpendicularly from the backing surface of the holding member along the blunt corner edge thereof; and a clamping part slidably mounted on the facing surface of the blade for movement in directions toward and away from the cutting edge of said blade and extending substantially perpendicularly from said facing surface, said clamping part comprising a clamping part member having substantially the same configuration as the holding part and having a front surface facing said holding part and an opposite rear surface, a pin extending substantially perpendicularly from said rear surface, a guide member consisting of a substantially right-angled angle member affixed to the facing surface of the blade and having a part extending substantially perpendicularly to said facing surface with a hole formed therethrough slidably accommodating said pin and a spring mounted on said pin in said guide member and abutting said clamping part member and said guide member in a manner whereby when the shears are fully closed after severing a stem the clamping part and the holding part securely clamp the severed stem between them, and a pair of side plates extending from the rear surface of said clamping part member in spaced parallel relation substantially perpendicular to the facing surface of said blade and straddling said guide member.

* * * * *